(No Model.)
J. J. MATHIS.
FRUIT PICKER.
No. 546,237. Patented Sept. 10, 1895.
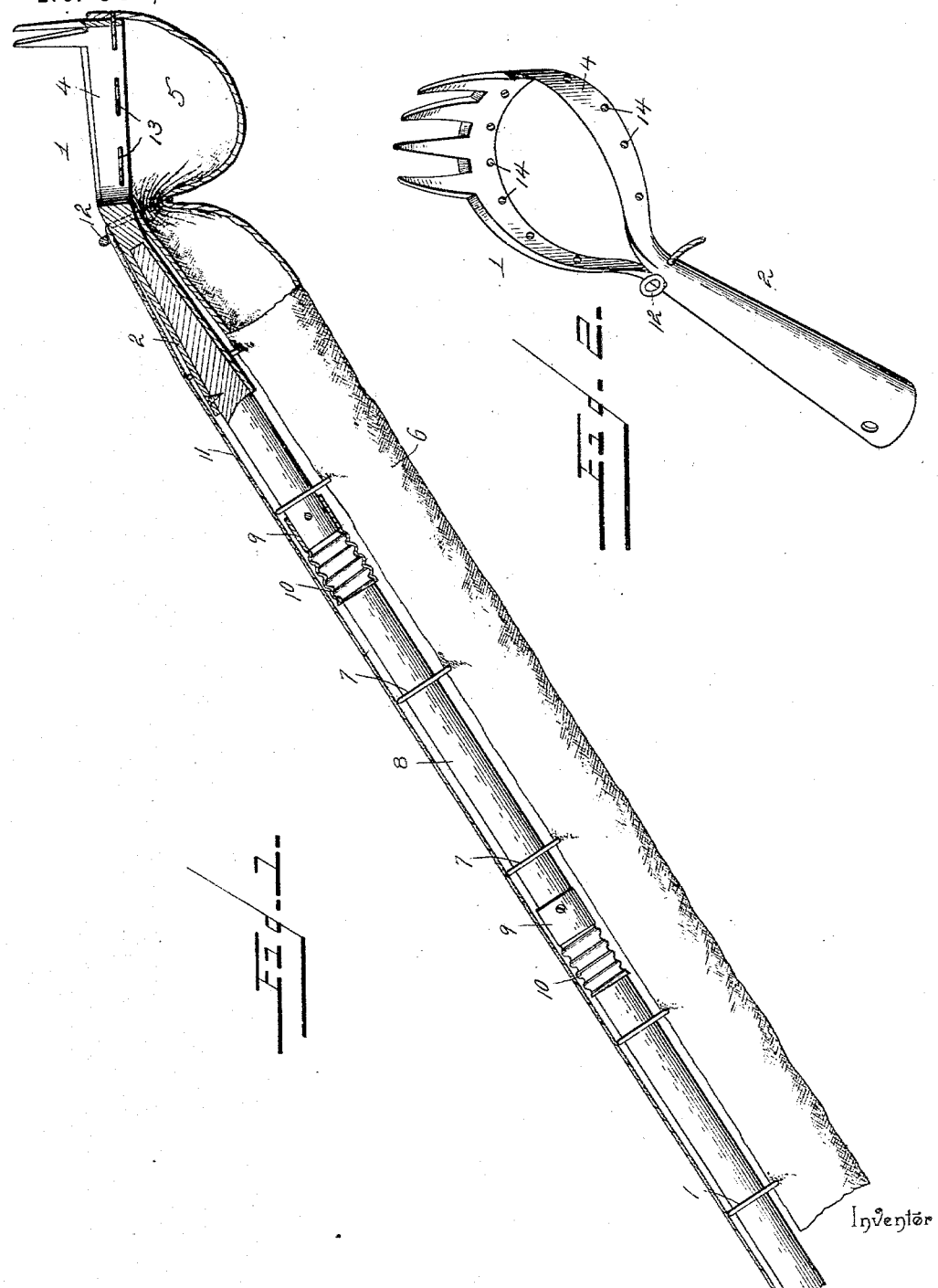
Witnesses
T. W. Riley
By his Attorneys.
C. A. Snow & Co.
Inventor
John J. Mathis.

UNITED STATES PATENT OFFICE.

JOHN J. MATHIS, OF PORTAGEVILLE, MISSOURI.

FRUIT-PICKER.

SPECIFICATION forming part of Letters Patent No. 546,237, dated September 10, 1895.

Application filed April 29, 1895. Serial No. 547,551. (No model.)

*To all whom it may concern:*

Be it known that I, JOHN J. MATHIS, a citizen of the United States, residing at Portageville, in the county of Pemiscot and State of Missouri, have invented a new and useful Fruit-Picker, of which the following is a specification.

My invention relates to fruit-gathering devices, and has for its object to provide a simple, inexpensive, and efficient construction whereby fruit may be detached from the tree and deposited in a suitable receptacle or upon the ground without bruising, the handle of the apparatus being constructed in sections to provide for making the same of a suitable length.

Further objects and advantages of the invention will appear in the following description, and the novel features thereof will be particularly pointed out in the appended claims.

In the drawings, Figure 1 is a side view, partly in section, of a fruit-picker constructed in accordance with my invention. Fig. 2 is a detailed view in perspective of the head of the picker.

Similar numerals of reference indicate corresponding parts in both the figures of the drawings.

The head 1 of the improved picker comprises a hollow tapered shank 2, integral with which is formed an oval frame 3, the broad portion of the oval being at the outer or remote end of the frame. Projecting upwardly from the outer end of the frame and integral therewith is a series of fingers adapted to be engaged with the fruit in order that it may be detached and dropped into a sack 5, which is connected to the frame. This sack is of flexible material, such as fabric, and is provided with a tubular extension or conveyer 6, extending from the bottom thereof and provided at intervals with guide-rings 7, which are fitted to slide upon the handle 8, said handle being tapered at its upper extremity and secured in the hollow shank of the head. This handle is preferably formed of detachable sections connected by means of couplings 9, said couplings being tubular in construction and being secured permanently to the lower end of each section with a projecting threaded portion 10, into which is secured the upper end of the adjoining lower section, and the sections are made of such length that by detaching one or more any desired length of handle may be provided.

Arranged at the bottom of the sack and at its point of juncture with the tubular conveyer is a draw-string 11, attached at one end to the shank of the head and extending at its loose end through an eye 12 on the shank, whereby it may be carried down the handle to a point within reach of the operator. By drawing this string the bottom of the sack may be closed to retain the fruit therein when it is desired to deposit it in a basket or container directly from the sack or when it is desirable to gather a quantity of fruit before it is allowed to pass through the conveyer. In other words, this draw-string provides for controlling the escape of the fruit from the sack to the conveyer, and as the conveyer is of flexible material it may be grasped by the hand of the operator near its lower end to again stop the fruit before finally depositing it in a receptacle.

From the above description it will be seen that the entire head of the implement is of integral construction, whereby the risk of displacement in use is reduced to a minimum, and the upper edge of the sack is secured to the frame by means of stitching 13, engaging perforations 14 in the frame, to provide for replacement when the sack becomes worn.

Various changes in the form, proportion, and the minor details of construction may be resorted to without departing from the spirit or sacrificing any of the advantages of this invention.

Having described my invention, what I claim is—

1. A fruit picker having an integral head comprising a hollow shank, an oval frame, and detaching fingers rising from the outer or remote end of the frame, a sectional handle having its uppermost section secured in the hollow shank of the head, and couplings between the sections whereby they may be detached, a flexible sack secured to the frame and extended to form a conveyer, guide-rings for the conveyer, and a draw-string arranged at the bottom of the sack whereby communication between the sack and the conveyer may be closed to retain fruit in the former, substantially as specified.

2. In a fruit picker, the combination with a head having an open frame provided with detaching fingers, and a handle connected to the head, of a flexible sack secured to the frame to receive fruit dropped therethrough, said sack being extended to form a conveyer, a guide-eye carried by the head, and a draw-string secured at one end to the head extending around the sack contiguous to the upper end of the conveyer and passed through said guide-eye, whereby the throat of the sack, or the part thereof in communication with the conveyer, may be contracted to prevent fruit from passing from the sack to the conveyer, substantially as specified.

In testimony that I claim the foregoing as my own I have hereto affixed my signature in the presence of two witnesses.

JOHN J. MATHIS.

Witnesses:
JAMES E. DE LISLE,
JONAH DE LISLE.